United States Patent [19]
Winfrey

[11] 3,900,076
[45] Aug. 19, 1975

[54] ROUGH TERRAIN VEHICLE UTILIZING GYROSCOPIC FORCES (INCHWORM)

[76] Inventor: Richard C. Winfrey, 1039 Cove, Ventura, Calif. 93003

[22] Filed: Nov. 16, 1973

[21] Appl. No.: 416,704

[52] U.S. Cl. ................................................. 180/8 E
[51] Int. Cl.² ......................................... B62D 57/02
[58] Field of Search ........ 180/7, 8; 244/79; 115/1 R

[56] References Cited
UNITED STATES PATENTS

| | | | |
|---|---|---|---|
| 2,371,368 | 3/1945 | Wallace | 180/8 R |
| 2,904,911 | 9/1959 | Colee | 244/79 X |
| 3,203,644 | 8/1965 | Kellogg | 180/7 R X |
| 3,237,885 | 3/1966 | Mohar | 115/1 R |
| 3,511,454 | 5/1970 | Hamilton | 244/79 |

Primary Examiner—Leo Friaglia
Assistant Examiner—R. Schrecengost
Attorney, Agent, or Firm—Richard S. Sciascia; J. M. St.Amand; Darrell E. Hollis

[57] ABSTRACT

A rough terrain vehicle utilizing gyroscopic forces comprising front and rear support members pivotally connected to opposite ends of a platform and constrained to controllably move in a common plane. A pair of flywheels having controls thereon connected to said platform via a gimbal system to impart gyroscopic forces to said platform thereby controllably raising a support member, controllably extending the member forward, and then controllably lowering the support member to the terrain. These steps are then repeated for the other support member whereby the vehicle traverses the rough terrain.

27 Claims, 3 Drawing Figures

3,900,076

3,900,076

ROUGH TERRAIN VEHICLE UTILIZING GYROSCOPIC FORCES (INCHWORM)

BACKGROUND OF THE INVENTION

1. Field of the Invention

The present invention relates, generally, to rough terrain vehicles and more particularly to rough terrain vehicles utilizing gyroscopic forces.

2. Description of the Prior Art

Historically, rough terrain has been traversed by tracked vehicles such as the bulldozer or tank. However, tracked vehicles are limited to certain types of terrain. For example, marshy or rocky terrain is either impassible or may be traversed only at slow speed. Military tanks can achieve fairly high speed, but only along well graded routes such as smooth fields or highways. Once rough terrain is encountered the tank must either stop or greatly reduce its speed.

One prior art vehicle utilizes a pair of pontoon like objects for support. A protrusion is wound around each pontoon in a helical manner so that the pontoon resembles a large screw. By rotating the pontoons about their respective longitudinal axes, the vehicle "screws" its way over marsh or water. Needless to say, because of the resulting sliding motion of the protrusion, the vehicle is unsuitable for travel across dry ground.

Another prior art vehicle utilizes an unbalanced, rotating weight to "hop" its way across the ground. The disadvantage is that the passenger and cargo must be mechanically isolated from the vibrations of the vehicle. Since, such a vehicle must rely heavily on ground friction, its effectiveness in traversing marshy terrain is greatly reduced. Further, it lacks the ability to traverse rocky terrain since the height of the hop is necessarily very small to avoid damaging the vehicle and its load.

Another prior art vehicle utilizes a telescoping leg which contracts, leans at an angle to the horizontal and expands propelling the vehicle into the air at its angle of leaning. While in the air the telescoping leg shifts to a position opposite its original leaning position, thus absorbing the shock of the vehicle when it returns to the ground. Upon coming to rest the leg returns to a vertical position and the above steps are repeated if continued movement is desired. Again such a vehicle suffers from vibrations created by impact with the ground. In addition, power consumption is enormous and stability is limited. Also, the vehicle must have a hard surface which to push off from and a relatively smooth surface which to land on. Such devices are expensive, complex, unstable and require an operator possessing a high level of skill.

SUMMARY

The general purpose of the present invention is to provide a rough terrain vehicle that is less complex, easier to operate, more stable, more versatile, faster, and capable of traversing rougher terrain than prior art devices. To attain this, the present invention provides a platform to which gyroscopic forces are imparted. Gyroscopic forces are created by flywheels and imparted to the platform via a gimbal system. Front and rear support members are pivotally connected to opposite ends of the platform and constrained to move in a common plane with respect to the platform. Hydraulic cylinders, connected between the support members and the platform, provide controllable movement of the support members with respect to the platform. The gyroscopic forces in synchronization with the hydraulic cylinders alternately raises each support member, extends it forward and then lowers it to the terrain.

Accordingly, an object of the present invention is to provide a vehicle capable of traversing rough terrain.

Another object of the present invention is to provide a vehicle capable of traversing dry ground, marsh, or water.

Another object of the present invention is to provide a vehicle that has no unbalanced rotating weight.

Another object of the present invention is to provide a vehicle that minimizes vibrations.

Another object of the present invention is to provide a vehicle that does not rely heavily on ground friction.

Another object of the present invention is to provide a vehicle capable of traversing rocky terrain.

Another object of the present invention is to provide a vehicle with small power consumption requirements.

Another object of the present invention is to provide a vehicle that exhibits great stability.

Another object of the present invention is to provide a vehicle that is inexpensive.

Another object of the present invention is to provide a vehicle that is incomplex in design and operation.

Another object of the present invention is to provide a vehicle capable of adapting to a variety of types of terrain.

Another object of the present invention is to provide a vehicle capable of traversing rough terrain at high speeds.

Another object of the present invention is to provide a vehicle capable of literally stepping over large obstacles.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein

DESCRIPTION OF THE PREFERRED EMBODIMENT

Figure 1:
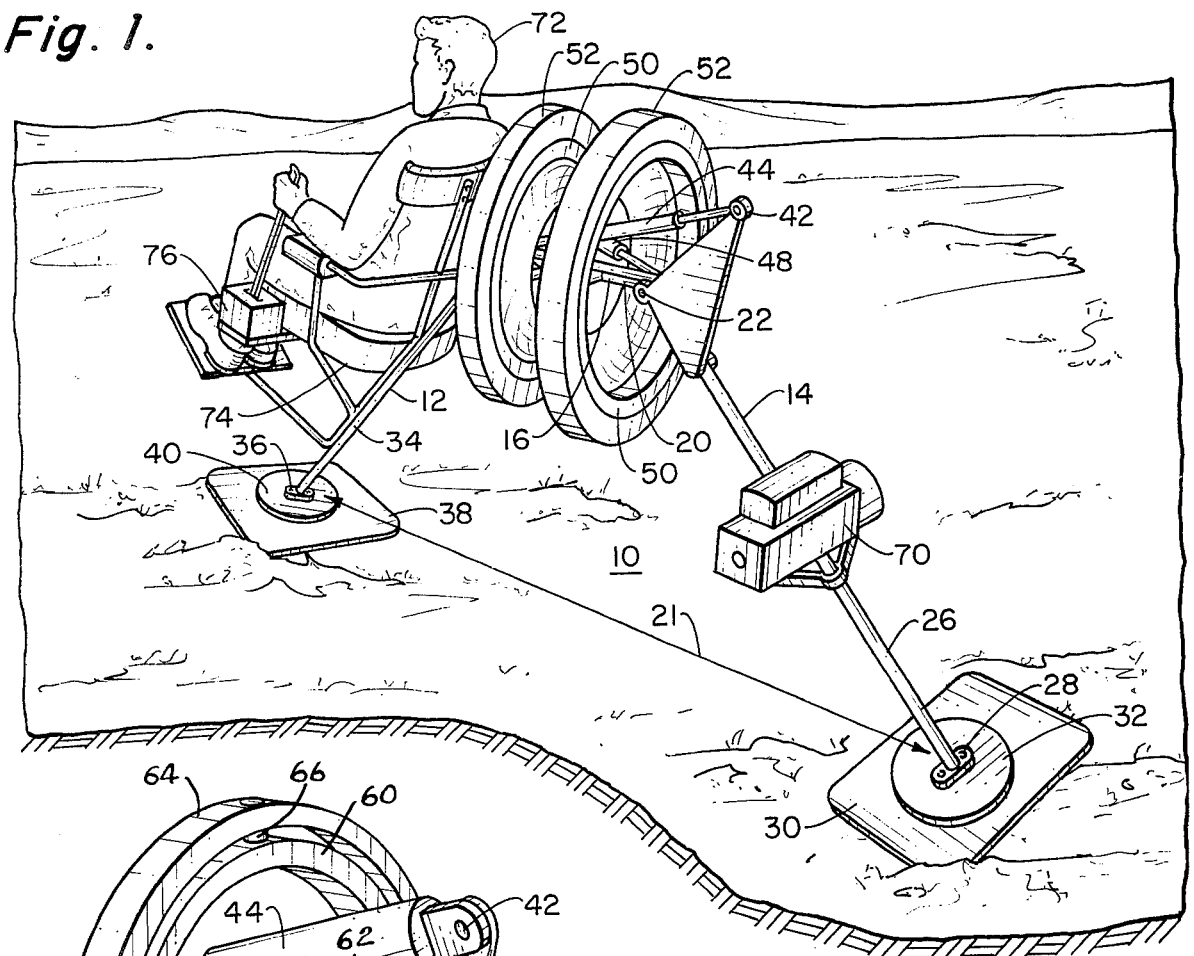
FIG. 1 is an isometric view of one embodiment of the present invention.
Figure 3:
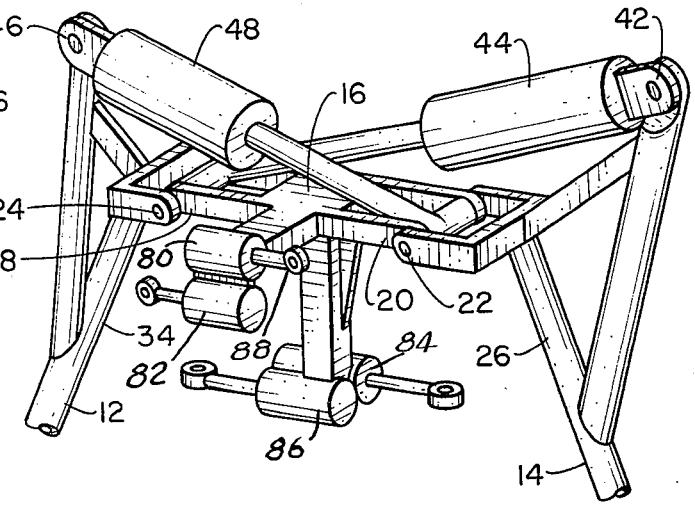
FIG. 3 is an isometric view of the platform of FIG. 1.

Referring to FIG. 1, the vehicle 10 comprises a front support member 12 and a rear support member 14. A platform 16 has a front end 18 and a rear end 20 (FIG. 3). Rear support member 14 is pivotally connected to rear end 20 at hinge point 22. Front support member 12 is pivotally connected to front end 18 (FIG. 3) at hinge point 24. Front support member 12, rear support member 14 and platform 20 comprise a common plane 21 in which rear support member 14 and front support member 12 are constrained to move.

Rear support member 14 comprises a rod 26. One end of rod 26 is attached to rear end 20 at hinge pivot 22. The other end is attached to hinge pivot point 28. Foot 30 is also connected to hinge pivot point 28 through its center of gravity. Foot 30 is hinged at its center of gravity so that when rear support member 14 is in the air, foot 30 will maintain position in a horizontal plane. Rear support member 14 may also include means 32 for controllably moving vehicle 10 in a horizontal plane about foot 30. Means 32 comprises a brake and axle assembly (not shown) similar to that of a conventional automobile.

Front support member 12 comprises a rod 34. One end of rod 34 is connected to platform 16 at hinge pivot point 24 (FIG. 3). The other end of rod 34 is connected to hinge pivot point 36. Foot 38 is also connected to hinge pivot point 28 through its center of gravity. Foot 38 is hinged at its center of gravity so that when front support member 12 is in the air, foot 30 will maintain position in a horizontal plane. Front support member 12 may also include means 40 for controllably moving vehicle 10 in a horizontal plane about foot 38. Means 40 comprises a brake and axle assembly (not shown) similar to that of a conventional automobile. If vehicle 10 is to possess the ability to change its direction of movement either means 32 or means 40 must be included. Of course, including both means 32 and means 40 contributes additional flexibility in changing direction to vehicle 10.

Attached to rear support member 14 at pivot point 42 is a hydraulic cylinder 44. Hydraulic cylinder 44 is also attached to platform 16 at pivot point 24 (FIG. 3).

Attached to front support member 12 at pivot point 46 (FIG. 3) is a hydraulic cylinder 48. Hydraulic cylinder 48 is also attached to platform 16 at pivot point 22.

Figure 2:
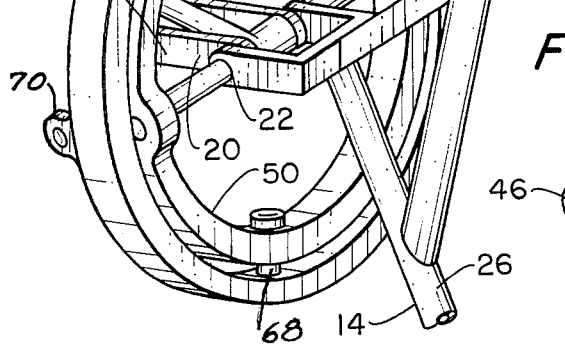
FIG. 2 is an isometric view of the gimbal system of FIG. 1.

A gimbal system 50 (FIG. 2) is attached to platform 16. FIG. 2 shows half of gimbal system 50 in detail. Gimbal system 50 connects to platform 16 in FIG. 2 at pivot point 22. However, as is appreciated by those skilled in the art and as shown in FIG. 1, gimbal system 50 may connect to platform 16 at other points.

A pair of flywheels 52 are mounted on gimbal system 50 about a horizontal axis. Of course, it is appreciated by those skilled in the art that vehicle 10 may employ more than two flywheels 52.

Gimbal system 50 is illustrated in FIG. 2 for a single flywheel 52. Inner gimbal ring 60 rotates about rod 62 while gimbal ring 64 rotates about rods 66 and 68. Rods 66 and 68 are connected to inner gimbal ring 60. A flywheel 52 is rotatably connected to outer gimbal ring 64 and disposed to rotate in a plane identical to or parallel to the plane formed by outer ring 64. The controls for gimbal system 50 are illustrated in FIG. 3 as gimbal control hydraulic cylinders 80, 82, 84, and 86. For example, cylinder 80 attaches to projection 70 shown in FIG. 2. When rod 88 of cylinder 80 moves in and out of cylinder 80, outer gimbal ring 64 rotates about an axis formed by a line drawn from rod 66 to rod 68. Similarly cylinder 82, 84, and 86 provide controlled movement to the inner and outer gimbal rings of gimbal system 50.

During operation, the two flywheels 52 will spin in opposite directions. Upon operator command, the two flywheels 52 will be precessed about the vertical axis at equal but opposite rates. Due to gyroscopic forces, the flywheels 52 will, via gimbal system 50, exert a torque on platform 16 causing vehicle 10 to rear back with front support member 12 raising off the ground and rear support member 14 supporting and balancing all the weight of vehicle 10. Simultaneously, as front support member 12 leaves the ground, hydraulic cylinders 44 and 48 are contracted, causing front support member 12 to be moved forward. Having extended front support member 12, the operator slows and then reverses the precession velocity so that front support member 12 is first gently returned to the ground and then rear support member 14 is raised. As rear support member 14 is raised, hydraulic cylinders 44 and 48 expand, causing rear support member 14 to move forward or closer to front support member 12. The precession velocity is again slowed and then reversed, and the cycle repeats itself with first front support member 12 and then rear support member 14 moving forward in the manner of an inchworm.

Steering is achieved by either releasing the brake (not shown) of means 40 as rear support member 14 is raised or releasing the brake (not shown) of means 32 as front support member 12 is raised and then simultaneously precessing flywheels 52 in opposite directions about the horizontal axis perpendicular to common plane 21. The resulting gyroscopic torque will cause vehicle 10 to rotate about foot 38 or foot 30 so as to point vehicle in any desired new heading.

The brakes of means 40 and 32 prevent or allow vehicle 10 to rotate in a horizontal plane about foot 38 and 30, respectively. For example, by allowing vehicle 10 to rotate controlably in a horizontal plane about foot 30 when foot 38 is raised from the ground, the direction of vehicle 10 can be determined by operator 72.

Another mode of movement may be accomplished by incorporating both means 32 and means 40 into vehicle 10. Movement is achieved by lifting rear support member 14 into the air. Rotating vehicle 10 about foot 38 by releasing the brake (not shown) of means 40. Returning rear support member 14 to the ground and lifting front support member 12 into the air. Rotating vehicle 10 about foot 30 by releasing the brake (not shown) of means 32. Then returning front support member 12 to the ground and repeating the above steps. This alternative could eliminate the need for hydraulic cylinders 44 and 48. Such movement is in a direction perpendicular to common plane 21.

It is noted that foot 30 and foot 38 are changeable so that different types of feet may be utilized to render vehicle 10 compatible with the type of terrain being traversed.

It will be appreciated by those skilled in the art that gimbal system 50, flywheels 52 and hydraulic cylinders 44 and 48 have power means to impart movement to them in response to control signals from control means operated by a human being. The operation and connection of such power means and control means are well known in the art. In FIG. 1 power means 70 is connected to rear support member 14. Operator 72, sitting on support 74 attached to front support member 12, is operating vehicle 10 by control means 76. The connections of power means 70 and control means 76 are not shown.

Other alternative embodiments of the present invention include physically disposing the spin axis of flywheels 52 vertically rather than horizontally as shown in FIG. 1. The counter rotating flywheels 52 would then function as those of FIG. 1 except steering would be accomplished by a temporary change in spin velocity of one of the flywheels. However, if flywheels 52 having a vertical spin axis were made to spin in the same direction, a large amount of vehicle stability may be obtained. For example, vehicle 10 could walk across a steep incline without toppling over.

Obviously, numerous modifications and variations of the present invention are possible in light of the above teachings. It is therefore to be understood that within the scope of the appended claims the invention may be practiced otherwise than as specifically described herein.

I claim:

1. A rough terrain vehicle utilizing gyroscopic forces comprising:
   a. a platform having a front end and a rear end;
   b. a front support member pivotally connected to said front end of said platform;
   c. a rear support member pivotally connected to said rear end of said platform; said front support member, said platform, and said rear support member being physically disposed in a common plane;
   d. means for imparting controlled pivotal movement in said common plane to said front support member with respect to said front end of said platform, said means being connected between said front support member and said platform;
   e. means for imparting controlled pivotal movement in said common plane to said rear support member with respect to said rear end of said platform, said means being connected between said rear support member and said platform; and
   f. means for imparting controlled gyroscopic forces to said platform such that said platform controllably rotates about an axis perpendicular to said common plane and about a vertical axis, said means being attached to said platform, said means for imparting controlled gyroscopic forces operates synchronously with said means for imparting controlled pivotal movement to said front support member and said means for imparting controlled pivotal movement to said rear support member such that said front support member is lifted into the air by said means for imparting controlled gyroscopic forces to said platform while said front support member is extended forward by said means for imparting controlled movement to said front support member then said front support member is lowered to the terrain by said means for imparting controlled gyroscopic forces to said platform and then said rear support member is lifted into the air by said means for imparting controlled gyroscopic forces to said platform while said rear support member is extended forward by said means for imparting controlled movement to said rear support member then said rear support member is lowered to the terrain by said means for imparting controlled gyroscopic forces to said platform whereby said vehicle traverses said rough terrain.

2. The vehicle of claim 1 wherein said means for imparting controlled gyroscopic forces to said platform comprises:
   a. a gimbal system attached to said platform;
   b. a plurality of flywheels attached to said gimbal system, said flywheels being capable of gyroscopic movement with respect to said gimbal system;
   c. means for imparting controlled gyroscopic movement to said flywheels; and
   d. means, communicating with said gimbal system, for controlling the gyroscopic forces created by said flywheels and imparted to said platform by said gimbal system.

3. The vehicle of claim 2 wherein said plurality of flywheels are physically disposed about a horizontal axis.

4. The vehicle of claim 3 wherein said plurality of flywheels comprise a first flywheel and a second flywheel.

5. The vehicle of claim 2 wherein said plurality of flywheels are physically disposed about a vertical axis.

6. The vehicle of claim 5 wherein said plurality of flywheels comprise a first flywheel and a second flywheel.

7. The vehicle of claim 1 wherein said front support member comprises:
   a. a rod having a first and a second end, said first end being pivotally connected to said platform;
   b. a foot;
   c. means, connected to said second end of said rod, for providing movement of said foot about an axis perpendicular to said common plane and passing through the center of gravity of said foot;
   d. means for providing movement of said vehicle in a horizontal plane about said foot, said means being connected between said foot and said means for providing movement to said foot about an axis perpendicular to said common plane; and
   e. means for controlling said movement of said vehicle in a horizontal plane about said foot.

8. The vehicle of claim 7 wherein said means for controlling said movement of said vehicle in a horizontal plane about said foot includes a braking device.

9. The vehicle of claim 1 wherein said rear support member comprises:
   a. a rod having a first and a second end, said first end being pivotally connected to said platform;
   b. a foot; and
   c. means for providing movement of said foot about an axis perpendicular to said common plane and passing through the center of gravity of said foot, said means being connected between said foot and said second end of said rod.

10. The vehicle of claim 1 wherein said rear support member comprises:
    a. a rod having a first and a second end, said first end being pivotally connected to said platform;
    b. a foot;
    c. means, connected to said second end of said rod, for providing movement of said foot about an axis perpendicular to said common plane and passing through the center of gravity of said foot;
    d. means for providing movement of said vehicle in a horizontal plane about said foot, said means being connected between said foot and said means for providing movement of said foot about an axis perpendicular to said common plane; and
    e. means for controlling said movement of said vehicle in a horizontal plane about said foot, said means being connected to said means for providing movement of said vehicle in a horizontal plane about said foot.

11. The vehicle of claim 10 wherein said means for controlling said movement of said vehicle in a horizontal plane about said foot includes a braking device.

12. The vehicle of claim 1 wherein said vehicle further comprises means for carrying a load attached to said front support member.

13. The vehicle of claim 1 wherein said vehicle further comprises means for carrying a load attached to said rear support member.

14. A rough terrain vehicle utilizing gyroscopic forces comprising:

a. a platform having a front end and a rear end;
b. a front support member affixed to said front end of said platform;
c. a rear support member affixed to said rear end of said platform, said front support member, said rear support member, and said platform being physically disposed in a common plane; and
d. means for imparting controlled gyroscopic forces to said platform such that said platform controllably tends to rotate about an axis perpendicular to said common plane and a vertical axis, whereby said front support member is raised into the air as said platform tends to rotate about said axis perpendicular to said common plane, then said front support member moves forward as said platform tends to rotate about said vertical axis, then said front support member is returned to the ground as said platform tends to rotate about said axis perpendicular to said common plane, then the above steps are repeated with said rear support member thereby traversing said rough terrain in a direction perpendicular to said common plane.

15. The vehicle of claim 14 wherein said means for imparting controlled gyroscopic forces to said platform comprises:
a. a gimbal system attached to said platform;
b. a plurality of flywheels attached to said gimbal system, said flywheels being capable of gyroscopic movement with respect to said gimbal system;
c. means for imparting controlled gyroscopic movement to said flywheels; and
d. means, communicating with said gimbal system, for controlling the gyroscopic forces created by said flywheels and imparted to said platform by said gimbal system.

16. The vehicle of claim 15 wherein said plurality of flywheels are physically disposed about a horizontal axis.

17. The vehicle of claim 16 wherein said plurality of flywheels comprise a first flywheel and a second flywheel.

18. The vehicle of claim 15 wherein said plurality of flywheels are physically disposed about a vertical axis.

19. The vehicle of claim 18 wherein said plurality of flywheels comprise a first flywheel and a second flywheel.

20. The vehicle of claim 14 wherein said front support member comprises:
a. a rod having a first and a second end, said first end being affixed to said platform;
b. a foot;
c. means, connected to said second end of said rod, for providing movement of said foot about an axis perpendicular to said common plane and passing through the center of gravity of said foot;
d. means for providing movement of said vehicle in a horizontal plane about said foot, said means being connected between said foot and said means for providng movement of said foot about an axis perpendicular to said common plane; and
e. means for controlling said movement of said vehicle in a horizontal plane about said foot, said means being connected to said means for providing movement of said vehicle in a horizontal plane about said foot.

21. The vehicle of claim 20 wherein said means for controlling said movement of said vehicle in a horizontal plane about said foot includes a braking device.

22. The vehicle of claim 14 wherein said rear support member comprises:
a. a rod having a first and a second end, said first end being affixed to said platform;
b. a foot;
c. means, connected to said second end of said rod, for providing movement of said foot about an axis perpendicular to said common plane and passing through the center of gravity of said foot;
d. means for providing movement of said vehicle in a horizontal plane about said foot, said means being connected between said foot and said means for providing movement of said foot about an axis perpendicular to said common plane; and
e. means for controllably preventing movement of said vehicle in a horizontal plane about said foot, said means being connected to said means for providing movement of said vehicle in a horizontal plane about said foot.

23. The vehicle of claim 22 wherein said means for controlling said movement of said vehicle in a horizontal plane about said foot includes a braking device.

24. The vehicle of claim 14 wherein said vehicle further comprises means for carrying a load attached to said front support member.

25. The vehicle of claim 14 wherein said vehicle further comprises means for carrying a load attached to said rear support member.

26. A method of traversing rough terrain utilizing a vehicle employing a gyroscope gimbally connected to a platform having a front support member having a front foot and a rear support member having a rear foot, said front member being pivotally attached to one end of said platform, said rear member being pivotally attached to the opposite end of said platform, said members being constrained to pivotally move in a common plane, said vehicle having means for providing movement of said vehicle in a horizontal plane about each said foot, and with means for providing movement of each said member with respect to said platform being connected between said platform and each said member, comprising:
a. lifting said front support member off the ground;
b. moving said front support member with respect to said platform in the required direction of movement;
c. moving said vehicle in a horizontal plane about said rear foot thereby adjusting the direction of movement as required;
d. lowering said front support member to the ground;
e. lifting said rear support member off the ground;
f. moving said rear support member with respect to said platform in the required direction of movement;
g. moving said vehicle in a horizontal plane about said front foot thereby adjusting the direction of movement as required;
h. lowering said rear support member to the ground.

27. A method of traversing rough terrain, utilizing a vehicle employing a gyroscope gimbally connected to a platform having a front support member having a front foot and a rear support member having a rear foot, said front member being attached to one end of said platform said rear member being attached to the opposite end of said platform, said vehicle having means for providing movement of said vehicle in a horizontal plane about each said foot, comprising:
 a. lifting said front support member off the ground;
 b. moving said vehicle in a horizontal plane about said rear foot in the required direction of movement;
 c. lowering said front support member to the ground;
 d. lifting said rear support member off the ground;
 e. moving said vehicle in a horizontal plane about said front foot in the required direction of movement;
 f. lowering said rear support member to the ground.

* * * * *